BEST AVAILABLE COPY

United States Statutory Invention Registration [19]

[11] Reg. Number: H464

Lee et al. [43] Published: May 3, 1988

[54] METAL HYDRIDE EXPLOSIVE SYSTEM

[75] Inventors: Woodrow W. Lee; Alexander G. Rozner, both of Potomac; James C. Waldron, Silver Spring, all of Md.

[73] Assignee: The United States of America as represented by the Secretary of the Navy, Washington, D.C.

[21] Appl. No.: 38,381

[22] Filed: Apr. 9, 1987

[51] Int. Cl.[4] ..... F42B 13/14; C06B 45/14

[52] U.S. Cl. ..... 102/364; 149/15; 149/109.2

*Primary Examiner*—John F. Terapane
*Assistant Examiner*—Eric Jorgensen
*Attorney, Agent, or Firm*—Kenneth E. Walden; Roger D. Johnson

[57] ABSTRACT

A molten metal-liquid explosive device comprising:

(1) a metal casing enclosing an inner space;

(2) a fusable metal wall dividing the inner space into a liquid chamber and a pyrotechnic material chamber;

(3) a liquid (e.g., water) contained in the liquid chamber;

(4) a pyrotechnic material essentially comprising an intimate mixture of (a) a magnesium nickel alloy hydride of the formula $MgNi_xH_y$ wherein $0 < x \leqq 0.50$ and $1.50 \leqq y \leqq 2.00$ and (b) a oxidizer selected from the group consisting of CuO, $Li_2O_2$, $BaO_2$, and mixtures thereof;

wherein the molar ratio of oxidizer to magnesium nickel alloy hydride ($MgNi_xH_y$) is from about 0.75:1 to about (1.50+0.5y):1 and wherein the pyrotechnic material is contained in the pyrotechnic material chamber in an amount sufficient to melt the fusable metal wall dividing the liquid chamber and the pyrotechnic material chamber; and (5) means for igniting the pyrotechnic material.

15 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BEST AVAILABLE COPY

BEST AVAILABLE COPY

BEST AVAILABLE COPY

BEST AVAILABLE COPY

METAL HYDRIDE EXPLOSIVE SYSTEM

BACKGROUND OF THE INVENTION

This invention relates to explosive devices and more particularly to steam or vapor explosive devices.

Conventional chemical explosives are frequently sensitive to heat and impact. Moreover, they generally yield toxic fumes when they burn as in a fire. Thus, these conventional explosives require special handling and storage precautions.

A phenomena of considerable industrial importance in recent years and one that may have significant military application is the so called vapor explosion, often referred to as thermal explosion or steam explosion. This phenomena results from the extremely rapid heat transfer from hot liquid (e.g., molten metal) when introduced into cold liquid (e.g., water). Sporadic explosions resulting from this phenomena have been responsible for loss of life and property in industry for a number of years and efforts have been made to understand the extreme violence of these interactions. It is not presently known exactly how these explosions are initiated. However, resultant effects of these interactions are drastic, and substantial amounts of energy are released during such explosions.

U.S. Pat. No. 4,280,409, entitled "Molten Metal-Liquid Explosive Device," which issued to Alexander G. Rozner and Horace H. Helms on July 28, 1981, discloses an explosive device which comprises (1) a metal liner composed of a metal selected from the group consisting of aluminum, magnesium, copper, and brass, the liner enclosing a chamber;

(2) a liquid contained in the chamber;

(3) a layer of pyrotechnic material surrounding the outside of the liner, the pyrotechnic material composed of a mixture of powders of (a) nickel; (b) metal oxide; and (c) an aluminum containing component which may be (i) aluminum or (ii) a mixture of from 50 to less than 100 weight percent of aluminum and from more than zero to 50 weight percent of a metal which can be magnesium, zirconium, bismuth, beryllium, boron, tantalum, copper, silver, niobium, or mixtures thereof; and (4) means for igniting the pyrotechnic material. The devices are compact, self-contained, safe, high energy explosives having relatively short initiation to detonation times. Nevertheless the devices work by the flowing contact of the molten pyrotechnic reaction products and the liquid (e.g., water). It would be desirable to provide a device in which the molten pyrotechnic reaction products are propelled into the liquid, thus reducing the initiation to detonation time and increasing the violence of the explosion. At the same time, it is desirable to retain the advantages of compactness and safety of the device.

SUMMARY OF THE INVENTION

Accordingly, one object of this invention is to provide a new explosive device.

Another object of this invention is to provide an explosive device which is insensitive to impact, friction, shock and elevated temperature.

Yet another object of this invention is to provide a thermally stable explosive device which is less likely to detonate in a fire than most organic chemical explosives are.

Another object of this invention is to provide an explosive device which will not burn or decompose to yield toxic vapors.

A still further object of this invention is to provide a molten metal-liquid device in which the molten material is forcefully injected into the liquid thus increasing the speed and energy of the resulting explosion.

These and other objectives of this invention are obtained by providing:

A molten metal-liquid explosive device comprising:

(1) a metal casing enclosing an inner space;

(2) a fusable metal wall dividing the inner space into a liquid chamber and a pyrotechnic material chamber;

(3) a liquid contained in the liquid chamber;

(4) a pyrotechnic material essentially comprising (a) a magnesium nickel alloy hydride of the formula $MgNi_xH_y$ wherein $0<x\leq 0.50$ and $1.50\leq y\leq 2.00$ and (b) a oxidizer selected from the group consisting of CuO, $Li_2O_2$, $BaO_2$, and mixtures thereof;

wherein the molar ratio of oxidizer to magnesium nickel alloy hydride ($MgNi_xH_y$) is from about 0.75:1 to about (1.50+0.5y):1 and wherein the pyrotechnic material is contained in the pyrotechnic material chamber in an amount sufficient to melt the fusable metal wall dividing the liquid chamber and the pyrotechnic material chamber; and (5) means for igniting the pyrotechnic material.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein:

FIGS. 3 through 6 are discussed in detail in the experimental section.

DETAILED DESCRIPTION OF THE PREFERRED EMBODIMENT

Figure 1:
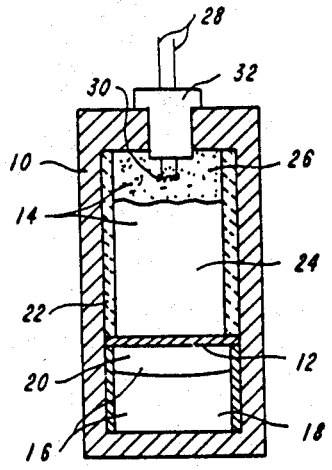
FIG. 1 shows a side cross-sectional view of the preferred closed liquid chamber molten metal-liquid explosive device.

Referring now to the drawings wherein like reference characters designate identical or corresponding parts throughout the several figures, and more preferably to FIG. 1 which shows a side cross-sectional view of the preferred molten metal-liquid explosive device which is shown to include a metal outer casing 10 which encloses a space which is divided by a fusable metal wall 12 into a pyrotechnic chamber 14 and a liquid chamber 16. The liquid chamber 16 contains a liquid 18 (e.g., water) and may have a space 20 to allow

BEST AVAILABLE COPY for expansion of the liquid 18 upon freezing. The pyrotechnic chamber 14 is lined with a layer of ceramic material 22 which thermally insulates the pyrotechnic chamber 14 and which protects the metal outer casing 10 from erosion. The pyrotechnic chamber 14 is primarily filled with a compacted form of the pyrotechnic mixture 24. A portion of the pyrotechnic mixture is in the form of a powder 26 to facilitate the rapid ignition of the pyrotechnic material 24 and 26. As shown in FIG. 1, an ignition coil 30 is inserted into the pyrotechnic material powder 26. The ignition coil 30 is attached to electrical leads 28 which pass out through the bolt 32 tightened to the outer casing 10 and are attached to a conventional power supply not shown.

The device of FIG. 1 operates as follows. An electric current passes through the ignition coil 30 igniting the pyrotechnic material power 26 which in turn ignites the compacted pyrotechnic material 24. Completion of the reaction takes less than one second. The reaction generates very high (2600° C.) temperatures and produces molten metal material, hydrogen gas, and water vapor. The molten metal material eats away the metal wall 12 and the very high gas pressure resulting from the super heated water vapor and hydrogen gas cause the molten metal material to be violently ejected from the pyrotechnic material chamber 14 into the liquid 18 in the liquid chamber 16. This extremely quick injection of molten material into the relatively cool liquid 18 results in a violent vapor explosion.

Figure 2:
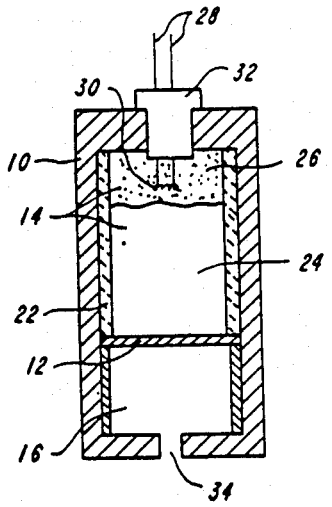
FIG. 2 shows a side cross-sectional view of an open liquid chamber molten metal-liquid explosive device.

FIG. 2 shows a side cross-sectional view of an open liquid chamber device which differs from the device shown in FIG. 1 in that no liquid is stored in the liquid chamber 16. Referring to FIG. 2, an opening 34 in the outer casing 10 is provided to permit a liquid (e.g., water) to enter the liquid chamber 16 from the external environment (e.g., an ocean, river, lake, etc.). The opening 34 may simply be a hole or it may be a oneway valve or other state of the art device. The remainder of the device is as described for FIG. 1. In use the device would be put into the liquid and the liquid chamber 16 would be allowed to fill with the liquid. The device would then be detonated by igniting the pyrotechnic material.

The pyrotechnic mixture is a critical feature of this invention. The mixture comprises a magnesium nickel alloy hydride as the fuel and an oxidizer selected from the group consisting of copper II oxide (CuO), lithium peroxide ($Li_2O_2$), barium peroxide ($BaO_2$), and mixtures thereof. The mixture not only generates intense heat, but also high pressures due to low molecular weight gases (e.g., $H_2O$, $H_2$, etc) which forcefully inject the hot reaction products into the liquid 18 in the liquid chamber 16 after the metal wall 12 has been breached. The magnesium nickel alloy hydrides are of the type which are used to store hydrogen in hydrogen powered vehicles such as those discussed by J. J. Reilly and Gary D. Sandrock in "Hydrogen Storage in Metal Hydrides," Scientific American, (February 1980), Vol. 242, No. 2 pp. 118–129 and by K. C. Hoffman et al. in "Metal Hydride Storage for Mobile and Stationary Applications," International Journal of Hydrogen Energy, Vol. 1, pp. 133–151 (Pergamon Press 1976).

The magnesium nickel alloy hydrides may be represented by the general formula $MgNi_xH_y$ wherein x is the atomic ratio of nickel to magnesium and y is the atomic ratio of hydrogen to magnesium. In general $0<x\leq 0.50$, preferably $0.05\leq x\leq 0.25$, and more preferably $0.10\leq x\leq 0.15$, and most preferably $x=2/15$; and $1.50\leq y\leq 2.00$, preferably $1.80\leq y\leq 2.00$, and more preferably $1.95\leq y\leq 2.00$.

Copper (II) oxide (CuO), lithium peroxide ($Li_2O_2$), and barium peroxide ($BaO_2$) are preferred as the oxidizers because they are thermally stable up to 500° C. and their heats of formation (the heat required to release oxygen) are lower than the heat of formation of water resulting in a net gain in heat. Copper (II) oxide generates the greatest pressure per unit of volume and lithium peroxide the greatest pressure per unit of weight. Note that nitrate, chlorate, and perchlorate salts are not used in this invention as oxidizer salts because of their relative instability.

The reactions between the magnesium nickel alloy hydride and the oxidizers can be represented by the following general equations $$MgNi_xH_y+(1+0.50fy)CuO\rightarrow MgO+(1+0.50fy)\text{-}Cu+xNi+0.5(1-f)yH_2+0.5fyH_2O \quad (1)$$

$$MgNi_xH_y+(1+0.5fy)Li_2O_2\rightarrow MgO+(1+0.5fy)\text{-}Li_2O+xNi0.5(1-f)yH_2+0.5fyH_2O \quad (2)$$

$$MgNi_xH_y+(1+0.5fy)BaO_2\rightarrow MgO+(1+0.5fy)\text{-}BaO+xNi+0.5(1-f)yH_2+0.5fyH_2O \quad (3)$$

wherein f is a fraction ranging from zero to one ($0\leq f\leq 1$), x is the atomic ratio of nickel to magnesium and y is the atomic ratio of hydrogen to magnesium in the magnesium nickel alloy hydride. When f is zero, the gas product is mostly hydrogen gas, since magnesium has much higher affinity with the oxygen of the oxides. As f approaches one (adding more oxidizer: CuO, $Li_2O_2$, or $BaO_2$) the hydrogen gas reacts with the additional oxidizer exothermically to generate water vapor. Therefore, the pressure generation per unit weight of the reactants is most efficient when f is zero whereas the heat generation is most efficient when f is one. Using these equations, the weight of a given oxidizer per weight of magnesium nickel alloy hydride $MgNi_xH_y$ needed to produce a stoichiometric reaction mixture can be calculated. A molar ratio of oxidizer to magnesium nickel alloy hydride of preferably from about 0.75:1.00 to about (1.50+0.5y):1.00, more preferably from 1.00:1.00 to (1.00+0.5y):1.00, and most preferably (1.00+0.25y):1.00 is used wherein y is the atomic ratio of hydrogen to magnesium in the magnesium nickel alloy hydride as shown above.

The pyrotechnic materials used in the molten metal-liquid explosive devices of this invention can be ignited in various conventional ways and once initiation occurs, the propagation velocity becomes a function of composition and density among other factors. For example (see FIG. 1), compressed powder configurations or pellets 24 made from the pyrotechnic mixtures can be ignited by placing them in contact with loose powders 26 of the same composition and then igniting the powder by means a small heating element 30 or alternatively electric matches or conventional ordnance igniter systems.

The final gas pressure depends on the volume ratio of the pellets to the free inner space of the device. The denser the pellets are and the smaller volume the free space occupies, the greater the final pressure becomes. The pressure could be over 40,000 psi.

The metal or alloy used in the metal wall 12 must not melt below the ignition temperature of the pyrotechnic mixture but must melt below the temperature generated by the ignited pyrotechnic mixture. Generally, a metal

BEST AVAILABLE COPY or alloy melting in the range of from 600° C. to 1400° C. will work well. Obviously, conventional factors such as strength, cost, corrosion resistance are also taken into consideration. Walls made of aluminum, copper, magnesium, or brass are preferred with aluminum walls being most preferred.

Referring to FIG. 1, the liquid 18 in the liquid chamber 16 may be water or any other liquid (e.g., organic solvents, nitric acid, etc.). Water is the most preferred solvent because it is nontoxic, nonflammable, inexpensive and available. A combination of water and an antifreeze (e.g., ethylene glycol) may be used for low temperature environments. As shown in FIG. 1, space 20 is left in the liquid chamber 16 for water 18 to expand into if it freezes. The amount of liquid used in the preferred design (FIG. 1) is from 6 to 15 weight percent of the weight of the pyrotechnic material used. The liquid chamber 16 of the open liquid chambered device (FIG. 2) is also designed to hold 6 to 15 weight percent of liquid based on the weight of the pyrotechnic material.

In the event of a fire, the liquid must be able to escape from the molten metal-liquid explosive device. Otherwise, an explosion may occur. This may be done by using a rupturable membrane or similar structure. A metal plug would be screwed into the outer casing over the membrane prior to activation of the molten metal-liquid explosive device. Another approach would be to store the device and liquid separately and then fill the chamber just prior to use.

The general nature of the invention having been set forth, the following examples are presented as specific illustrations thereof. It will be understood that the invention is not limited to these specific examples, but is susceptible to various modifications that will be recognized by one of ordinary skill in the art.

EXPERIMENTAL

The magnesium nickel alloy hydride used in Examples 1 through 5 was of the formula $MgNi_{0.133}H_2$. The molar ratio of CuO to $MgNi_{0.133}H_2$ used in examples 1, 2, and 5 was 2:1 (a weight ratio of 160:34). The molar ratio of $Li_2O_2$ to $MgNi_{0.133}H_2$ used in examples 3 and 4 was 2:1 (a weight ratio of 91:34). Both the pellets and the loose powder in each example were of the same composition.

Figure 3:
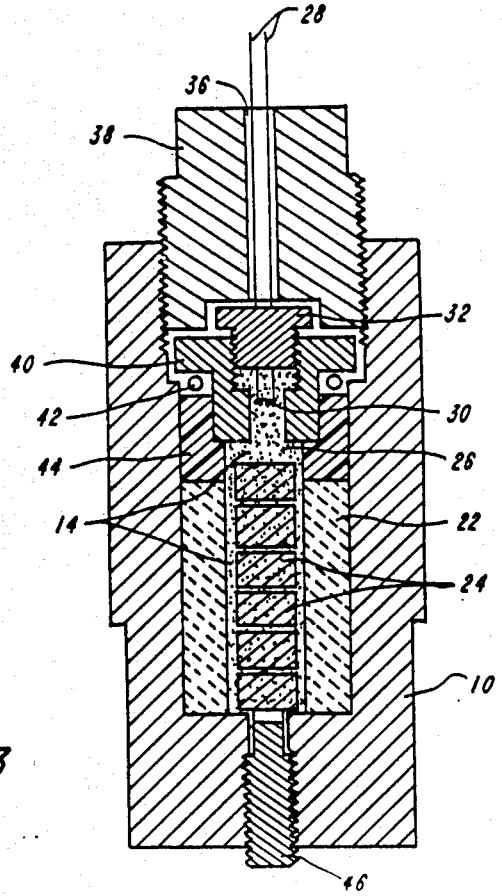
FIG. 3 shows a side cross-sectional view of a test molten metal explosive device used in examples 1 through 4.

FIG. 3 shows a side cross-sectional view of a device used to test and measure the power of the reaction of various magnesium nickel alloy hydride/oxidizer mixtures before the reaction products are mixed with the liquid (water). This test device was used in Examples 1 through 4. The design of the device is more complex than that of the actual explosive devices shown in FIGS. 1 and 2 because the test device is designed to be reused and to precisely measure the maximum pressures generated by the reactions. (Note that the water chamber is omitted from the test device of FIG. 3). Referring to FIG. 3, a hollow cylindrical stainless steel outer casing 10 partially enclose a pyrotechnic chamber 14 which is lined with a ceramic liner 22 in combination with a graphite liner 44. The graphite liner is machined to have a very even surface upon which a copper gasket 42 rests. An annular stainless steel lower cap 40 rests on the copper gasket 42. A Holex 1196A igniter 32 is threaded into the lower cap 40. A cylindrical stainless steel upper cap 38 screws into the top of the outer casing 10 and presses down the lower cap 40 which presses the copper gasket 42 against the even surface of the graphite liner 44 providing strong air tight seal. A pressure transducer 46 is screwed into an opening at the bottom of the stainless steel outer casing 10 and is used to monitor the pressure inside of the pyrotechnic chamber 14. Magnesium nickel alloy hydride/oxidizer pellets 24 are placed in the pyrotechnic chamber 14 and a mixture of loose powder 26 of the same composition is placed on top of the pellets 24. Leads 28 which pass through a hole 36 in the upper cap 38 connect the Holex igniter 32 and coil 30 to a power supply not shown. The coil 30 is placed into the loose hydride/oxidizer powder 26. An electric current passing through the coil 30 ignites the loose hydride/oxide powder 26 which then ignites the hydride/oxide pellets 24. The pressure of the resulting explosive, thermal reaction in the pyrotechnic chamber 14 is measured by pressure transducer 46 which is connected to a recording device not shown.

EXAMPLE 1

Figure 4:
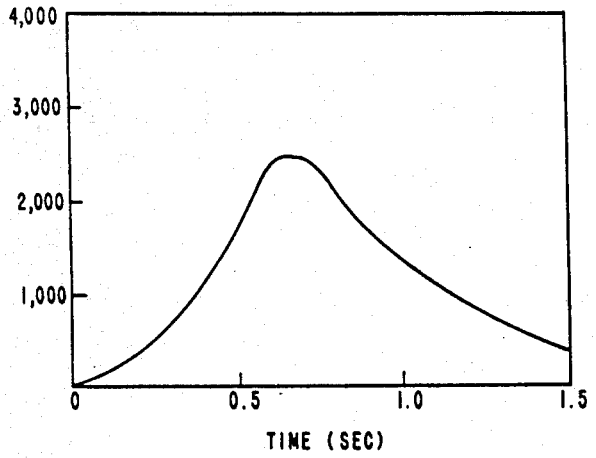
FIG. 4 shows a pressure-time profile of a test (example 1) carried out by using the device shown in FIG. 3.

2 gm of the pellets made of the mixture of the metal hydride and CuO and 0.6 gm of the loose powder of the same mixture were ignited. Peak pressure of 2,500 psi was reached in 0.65 second after the ignition (FIG. 4).

EXAMPLE 2

8 gm of the pellets made of the mixture of the metal hydride and CuO and 0.6 gm of the loose powder of the same mixture were ignited. Peak pressure of 14,500 psi was reached in 0.2 second after the ignition.

EXAMPLE 3

2 gm of the pellets made of the mixture of the metal hydride and $Li_2O_2$ and 0.6 gm of the loose powder of the same mixture were ignited. Peak pressure of 9,300 psi was reached in 0.08 second after the ignition.

EXAMPLE 4

4 gm of the pellets made of the mixture of the metal hydride and $Li_2O_2$ and 0.6 gm of the loose powder of the same mixture were ignited. Peak pressure of 20,000 psi was reached. The reaction was violent enough to blow out the cap.

Figure 5:
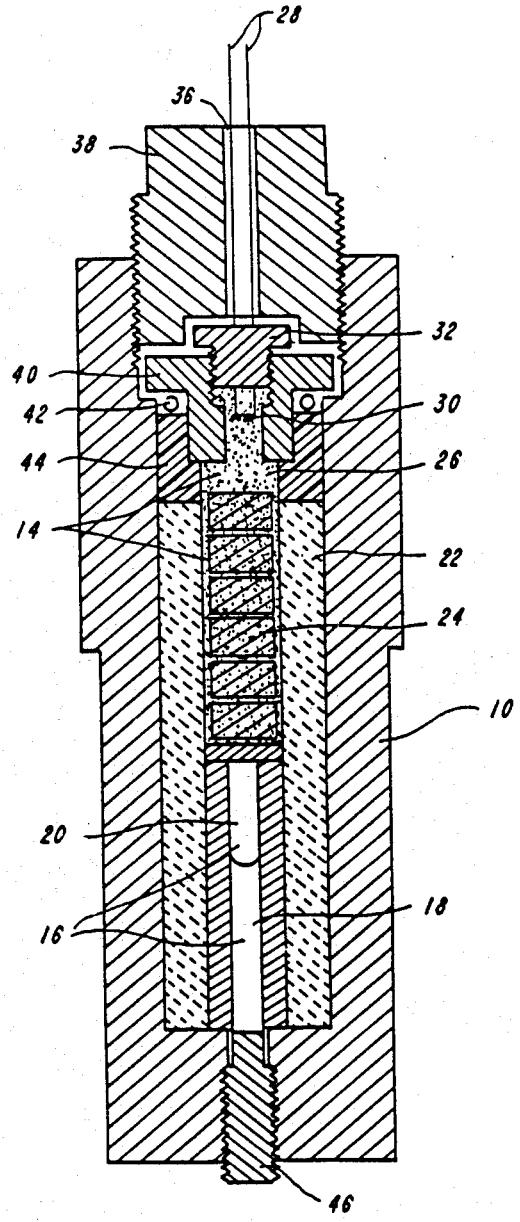
FIG. 5 shows a side cross-sectional view of the test molten metal-liquid explosive device used in Example 5.

FIG. 5 shows a side cross-sectional view of a device used to measure the maximum pressure generated by the molten magnesium nickel alloy hydride/oxidizer reaction products with a liquid. The device of FIG. 5 is the same as that shown in FIG. 3 except for the following modification. The outer casing 10 is extended to accommodate a liquid chamber 16 which is partially filled with water 18 leaving a space 20. The pyrotechnic chamber 14 is separated from the liquid chamber 16 by a fusable metal (e.g. aluminum) wall 12. The metal hydride/oxide reaction is initiated as described for FIG. 3 (examples 1–4) above. The resulting molten reaction products eat through the metal wall 12 and the hydrogen gas and water vapor produced by the metal hydride/oxidizer reaction eject the molten reaction products from the pyrotechnic chamber 14 into the water 18 contained in liquid chamber 16 causing a violent molten metal/liquid explosion which is measured by the pressure transducer 46. The transducer 46 is attach to a recording device not shown. The device of FIG. 5 was used in example 5.

EXAMPLE 5

8 gm of the pellets made of the metal hydride and CuO and 0.6 gm of the loose powder of the same mixture were ignited and the reaction products were injected into a 2 ml water pool. Peak pressure of 3,000 psi

Figure 6:
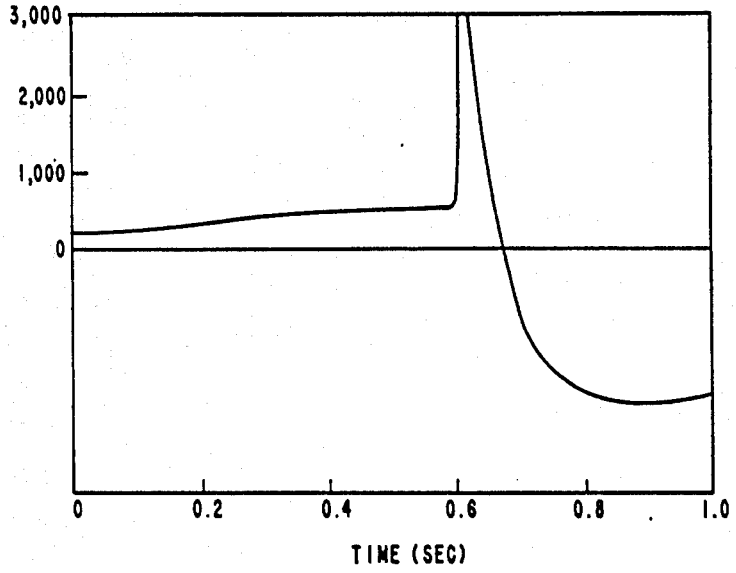
FIG. 6 shows a pressure-time profile of a test (example 5) carried out by using the device shown in FIG. 5.

BEST AVAILABLE COPY was reached with about 0.02 second rise time (FIG. 6). The volume of free space in this test was considerable larger than the previous tests (examples 1–4).

Obviously, numerous modifications and variations of the present invention are possible in light of the above teachings. It is therefore to be understood that within the scope of the appended claims the invention may be practiced otherwise than as specifically described herein.

What is claimed and desired to be secured by Letters Patent of the United States is:

1. A molten metal-liquid explosive device comprising:

(1) a metal casing enclosing an inner space;

(2) a fusable metal wall dividing the inner space into a liquid chamber and a pyrotechnic material chamber;

(3) a liquid contained in the liquid chamber;

(4) a pyrotechnic material essentially comprising (a) a magnesium nickel alloy hydride of the formula $MgNi_xH_y$ wherein $0<x\leqq 0.50$ and $1.50\leqq y\leqq 2.00$ and (b) a oxidizer selected from the group consisting of CuO, $Li_2O_2$, $BaO_2$, and mixtures thereof;

wherein the molar ratio of oxidizer to magnesium nickel alloy hydride is from about 0.75:1.00 to about (1.50+0.5y):1.00, and wherein the pyrotechnic material is contained in the pyrotechnic material chamber in an amount sufficient to melt the fusable metal wall dividing the liquid chamber and the pyrotechnic material chamber; and (5) means for igniting the pyrotechnic material.

2. The device of claim 1 wherein $0.05\leqq x\leqq 0.25$.

3. The device of claim 2 wherein $0.10\leqq x\leqq 0.15$.

4. The device of claim 3 wherein x is about 2/15.

5. The device of claim 1 wherein the liquid is selected from the group consisting of water, liquid aliphatic alcohols of from 1 to 5 carbon atoms, and mixtures thereof.

6. The device of claim 1 wherein the liquid is water.

7. The device of claim 1 wherein $1.80\leqq y\leqq 2.00$.

8. The device of claim 7 wherein $1.95\leqq y\leqq 2.00$.

9. The device of claim 1 wherein the molar ratio of oxidizer to magnesium nickel alloy hydride is from 1.00:1.00 to (1.0+0.5y):1.00.

10. The device of claim 9 wherein the molar ratio of oxidizer to magnesium nickel alloy hydride is (1.00+0.25y):1.00.

11. The device of claim 1 wherein the fusable metal wall is made of a metal selected from the group consisting of aluminum, copper, and magnesium.

12. The device of claim 11 wherein the fusable metal is aluminum.

13. The device of claim 1 wherein the oxidizer is CuO.

14. The device of claim 1 wherein the oxidizer is $Li_2O_2$.

15. The device of claim 1 wherein the fusable metal wall is made of an alloy which is brass.

* * * * *